(12) United States Patent
Connors

(10) Patent No.: US 8,727,436 B2
(45) Date of Patent: May 20, 2014

(54) BICYCLE SEAT CLAMP ASSEMBLY

(75) Inventor: Brendan Connors, Silverado, CA (US)

(73) Assignee: Felt Racing, LLC, Irvine, CA (US)

( * ) Notice: Subject to any disclaimer, the term of this patent is extended or adjusted under 35 U.S.C. 154(b) by 276 days.

(21) Appl. No.: 13/290,717

(22) Filed: Nov. 7, 2011

(65) Prior Publication Data

US 2013/0113242 A1     May 9, 2013

(51) Int. Cl.
    *B62J 1/10*     (2006.01)
(52) U.S. Cl.
    USPC .................................. 297/195.1; 297/215.13
(58) Field of Classification Search
    USPC ............................. 297/215.14, 215.13, 195.1
    See application file for complete search history.

(56) References Cited

U.S. PATENT DOCUMENTS

| | | | |
|---|---|---|---|
| 4,180,345 A | 12/1979 | Routens | |
| 5,295,727 A * | 3/1994 | Kao | 297/215.14 |
| 5,333,826 A | 8/1994 | Lai | |
| 5,722,718 A | 3/1998 | Still et al. | |
| 5,749,622 A | 5/1998 | Tseng | |
| 5,988,741 A | 11/1999 | Voss et al. | |
| 7,431,391 B2 * | 10/2008 | Hsiao | 297/215.15 |
| 7,681,947 B2 | 3/2010 | Ritchey | |
| 8,083,289 B2 * | 12/2011 | Chang | 297/215.15 |
| 2002/0166941 A1 | 11/2002 | Dunlap | |
| 2006/0006707 A1 | 1/2006 | Lin | |
| 2009/0001782 A1 | 1/2009 | Lin | |
| 2009/0218857 A1 | 9/2009 | Ochendalski | |
| 2010/0007182 A1 | 1/2010 | Tisue | |
| 2010/0171347 A1 | 7/2010 | Ritchey | |
| 2010/0213744 A1 | 8/2010 | Ritchey | |
| 2010/0244509 A1 | 9/2010 | Chang | |

* cited by examiner

*Primary Examiner* — David R Dunn
*Assistant Examiner* — Timothy J Brindley
(74) *Attorney, Agent, or Firm* — Stetina Brunda Garred & Brucker

(57) ABSTRACT

A bicycle seat clamp assembly is disclosed herein which comprises upper and lower members to provide a vertical clamping force to the rails of a seat to attach a seat to the seat post. The upper and lower members are actuated by a horizontal fastening device which can be tightened or loosened with one hand. The bicycle seat clamp assembly provides for fine tuning of a front to back angular tilt as preferred by the user. Moreover, the seat post can be rotated to the forward direction or the rearward direction to increase a front to back adjustment range of the seat.

14 Claims, 9 Drawing Sheets

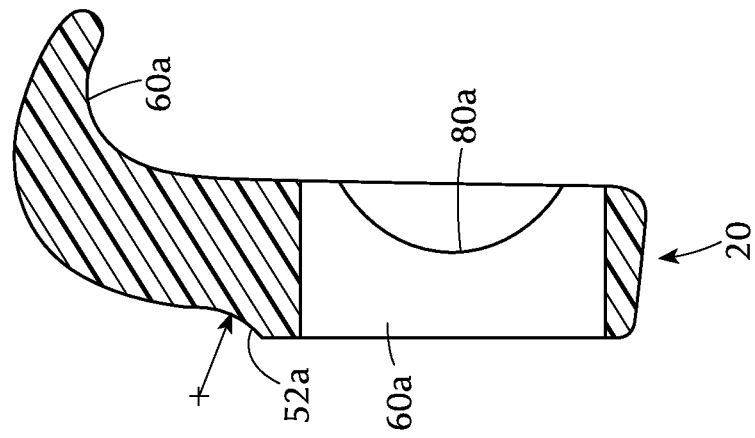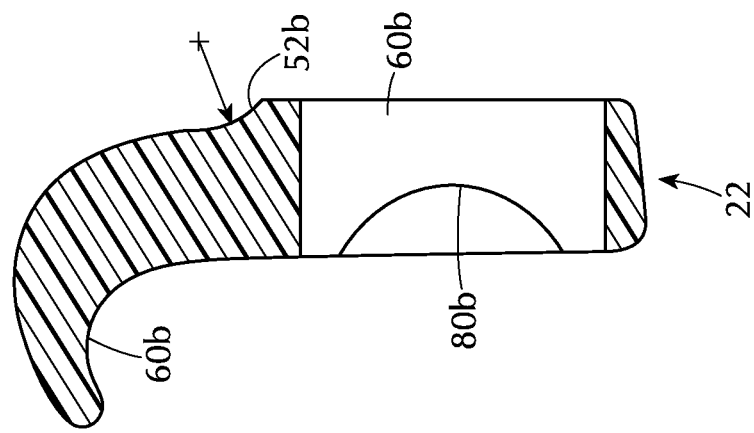
FIG. 8

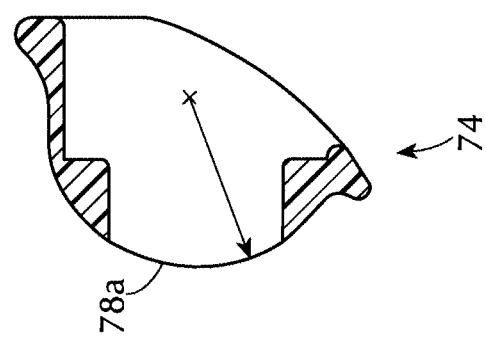
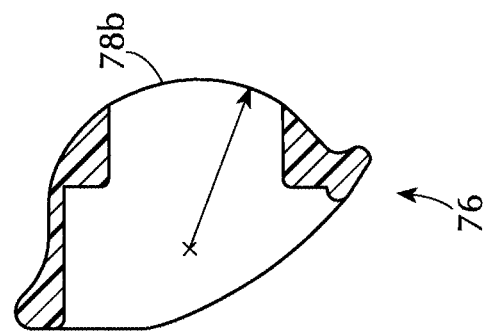
FIG. 9

BICYCLE SEAT CLAMP ASSEMBLY

CROSS-REFERENCE TO RELATED APPLICATIONS

Not Applicable

STATEMENT RE: FEDERALLY SPONSORED RESEARCH/DEVELOPMENT

Not Applicable

BACKGROUND

The embodiments disclosed herein relate to a bicycle seat clamp assembly for attaching a seat to a seat post of a bicycle.

Prior art bicycle seat clamp assemblies are provided in many different arrangements. For example, the rails of prior art seats may have straight sections. The prior art seat clamp clamps onto these straight sections to attach the seat to the seat post.

When attaching the seat to the bicycle, the front to back position of the seat must be adjusted to the rider's body geometry and the geometry of the bicycle in order to gain optimal comfort and power output. Bicycles are manufactured in set standard sizes such as small, medium and large for purposes of reducing cost. However, bicycle riders all have different heights and body geometries. Even riders of the same height have different inseams and different body geometries. In an attempt to accommodate these differences, the bicycle is manufactured with different adjustments. For example, the seat is attached to the seat post so that the seat can be adjusted with respect to its front to back position and tilt angle. This allows the rider's legs to be optimally positioned over the pedals when in the seated position. Unfortunately, the straight sections of the rails of the bicycle seat have a set length. Thus, the front to back adjustment of the seat is limited. For riders that fall between bicycle sizes such as small and medium or medium and large, the existing front to back adjustments may not be sufficient to optimally position the rider on the bicycle with respect to the pedals. Accordingly, when fitting a bicycle to a rider, compromises are made recognizing these limitations to optimally position the rider on the bicycle to increase power output.

In a standard bicycle fit, the convention is to adjust the seat so that it is level with the ground. In other words, the front nose and the rear portion of the seat which supports the rider's sit bones should be horizontal to the ground. However, some riders prefer to tilt the seat nose up while others prefer to tilt the seat nose down. Unfortunately, prior art bicycle seat clamp assemblies provide limited front to back angular tilt ranges which may be insufficient for the rider's preference.

Moreover, prior art bicycle seat clamp assemblies may have a pair of mating curved surfaces to allow for the angular tilt. These curved surfaces may be knurled to prevent inadvertent angular movement of the seat during riding. Unfortunately, the knurls lock the seat into set tilt angles which may not be preferred by the rider.

Prior art bicycle seat clamp assemblies conventionally have a clamping mechanism that produces a vertical clamping force on the rails of the seat. Seats with standard rails may be used in these systems. However, modern bicycle seat clamp assemblies may clamp onto the sides of the rails. Unfortunately, these side clamping seat clamp assemblies are manufactured to fit only one rail size (e.g., 7×9 mm oval rails or 7 mm round rails). Hence, one side clamping seat clamp assembly fits one rail size. A different rail size requires a different side clamping seat clamp assembly.

Prior art bicycle seat clamp assemblies are also cumbersome to operate. Also, the bolts and screws may be awkwardly located so as to be inconvenient for the user to tighten.

Accordingly, there is a need in the art for an improved bicycle seat clamp.

BRIEF SUMMARY

The bicycle seat clamp assembly disclosed herein addresses the needs discussed above and those that are known in the art.

The bicycle seat clamp assembly provides vertical clamping forces to rails of a seat to attach the seat to the seat post. The vertical clamping forces are actuated by a horizontal fastening device which can be tightened or loosened with one hand and is easy to access. The bicycle seat clamp assembly has upper and lower members which clamp down vertically on the rails of the seat to attach the seat to the seat post. Hence, seats with standard conventional rails may be used. Hence, one bicycle seat clamp assembly fits many different standard rail sizes. The seat clamp assembly does not have to be matched up with the rail size of the desired seat. The seat may be tilted from front to back as desired by the user. Moreover, the seat post can be rotated to the forward direction or the rearward direction to increase the front to back positional range of the seat while maintaining the preferred angular tilt of the seat by the rider so that the rider can be optimally positioned to the pedal.

More particularly, a seat clamp assembly for securing a bicycle seat to a bicycle frame is disclosed. The seat clamp assembly may comprise a body, a first member, a second member, a third member, a fourth member and a fastening system. The body may define a vertical plane. The first member may be disposed on a first side of the body. The first member may have a curved surface defining a first pivot axis which is oriented parallel to the vertical plane. The second member may be disposed on an opposed second side of the body. The second member may also have a curved surface defining a second pivot axis which is oriented parallel to the vertical plane.

The third member may be disposed against the first member and pivotable about the first pivot axis to provide for vertical displacement of the third member. Similarly, the fourth member may be disposed against the second member and pivotable about the second pivot axis to provide for vertical displacement of the fourth member.

The fastening system may extend through the aperture of the housing for fixing relative positions of the first, second, third and fourth members together upon tightening of the fastening system. The third and fourth members are vertically displaced upon tightening of the fastening system. Additionally, the first and second members along with the third and fourth members produce a vertical clamping force applied to rails of the bicycle seat between first, second, third and fourth members.

The first and second members may be disposed inward with respect to the third and fourth member from the vertical plane. The first and second members may be disposed on one side of the rails and the third and fourth members may be disposed on the other side of the rails. The first and second members may be disposed under the rails and the third and fourth members are disposed above the rails.

The body may have an aperture defined by frusto conical surfaces which extend 360 degrees about a central axis of the aperture to allow for a wide range of front to back angular tilting of the seat so that a seat post can be rotated in a forward direction or a rearward direction while maintaining a preferred angular tilt of the seat (e.g., ±10° or 0°).

More particularly, the body may form a housing having an aperture formed therethrough. The aperture may define a central axis which is horizontal to a ground and perpendicular to the vertical plane. The aperture may define first and second opposed frusto conical surfaces. The first member may have a first frusto conical surface which mates with the first frusto conical surface of the aperture of the housing. Also, the second member may have a second frusto conical surface which mates with the second frusto conical surface of the aperture of the housing.

At least one of the first frusto conical surface of the aperture and the first frusto conical surface of the first member may have knurls. Additionally or alternatively, at least one of the second frusto conical surface of the aperture and the second frusto conical surface of the second member may have knurls. These knurls mitigate inadvertent front to back angular tilting of the seat during use after tightening of the fastening device.

Instead of knurls, it is contemplated that the first and second frusto conical surfaces of the aperture and the first and second frusto conical surfaces of the first and second members are smooth to allow for fine tuning of front to back angular tilting of the seat. This allows for infinite tilt angles of the seat without indexing of the tilt angle of the seat. The knurls discussed herein index the tilt angle of the seat.

The curved surfaces of the first and second members have a semi circular cross section and mate with corresponding curved surfaces of the third and fourth members.

In another aspect, a method for attaching a seat to a seat post of a bicycle is disclosed. The method may comprise the steps of opening first upper and lower members and second upper and lower members of a seat clamp assembly so that a first entrance defined by the first upper and lower members and a second entrance defined by the second upper and lower members are sufficient to receive first and second rails of the seat; fitting a first rail of the seat between the first upper and lower members and the second rail of the seat between the second upper and lower members; tightening a horizontal fastening device; and pivoting the first and second upper members about pivot axes defined by the first and second lower members to vertically displace the first and second upper members so that the first and second upper and lower members apply vertical clamping forces on the first and second rails of the seat.

The pivoting step may include sliding a contact surface of the first upper member against a mating contact surface of the first lower member and sliding a contact surface of the second upper member against a mating contact surface of the second lower member. The contact surfaces of the first and second upper and lower members have a semi-circular cross section and have a common radius.

The horizontal fastening device utilized in the method may comprise first and second fastening components. The first component may have internal threads and the second component may have external threads aligned perpendicularly to a vertical plane defined by a body of the seat clamp assembly. The internal threads of the first component may engage deeper on the external threads of the second component as the fastening device is tightened.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 8 is a cross sectional view of upper members of the bicycle seat clamp assembly shown in FIG. 3; and FIG. 9 is a cross sectional view of washers of the bicycle seat clamp assembly shown in FIG. 3.

DETAILED DESCRIPTION

Figure 1:
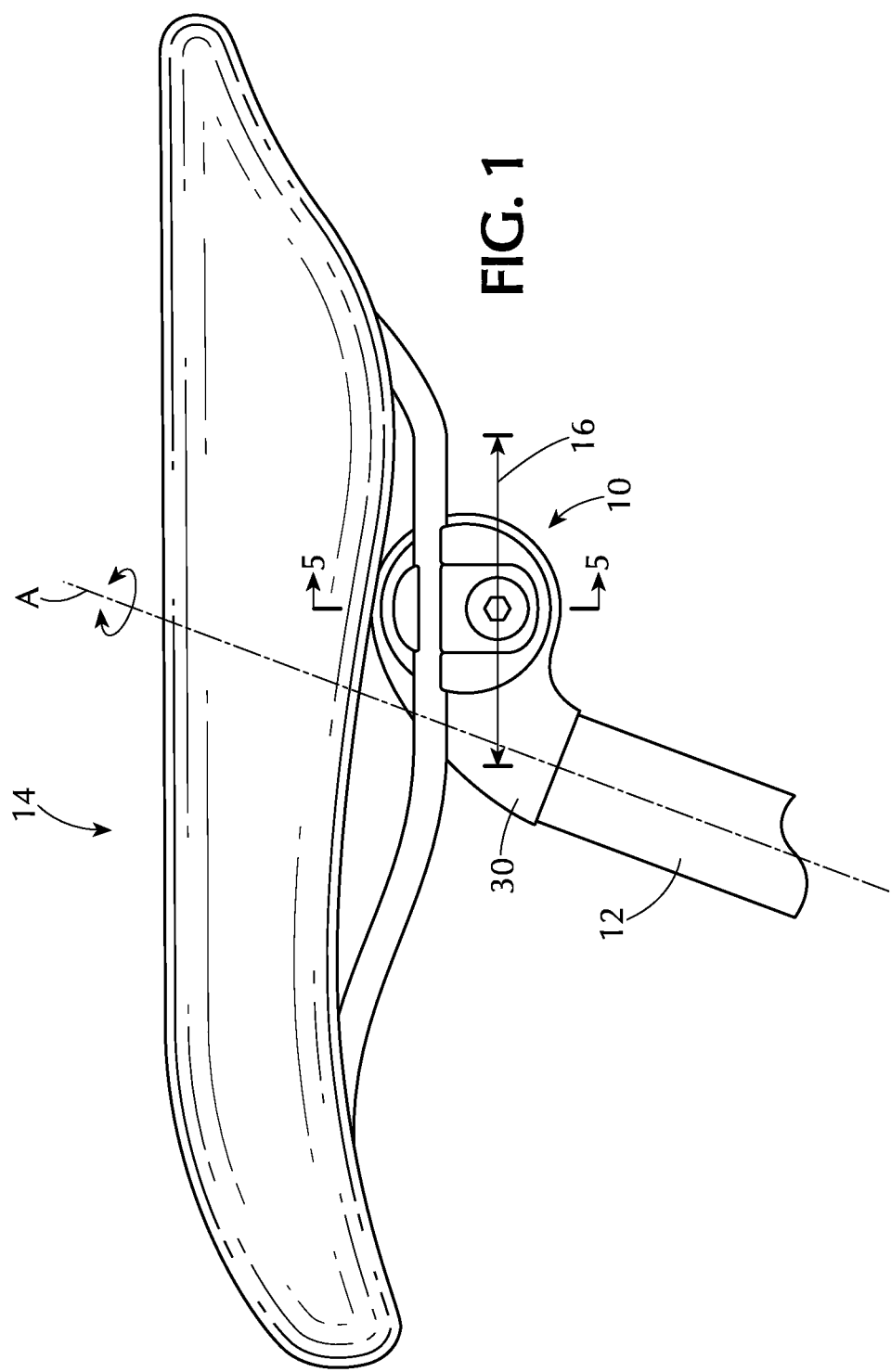
FIG. 1 illustrates a side view of a bicycle seat clamp assembly with a seat post in a rearward direction.
Figure 2:
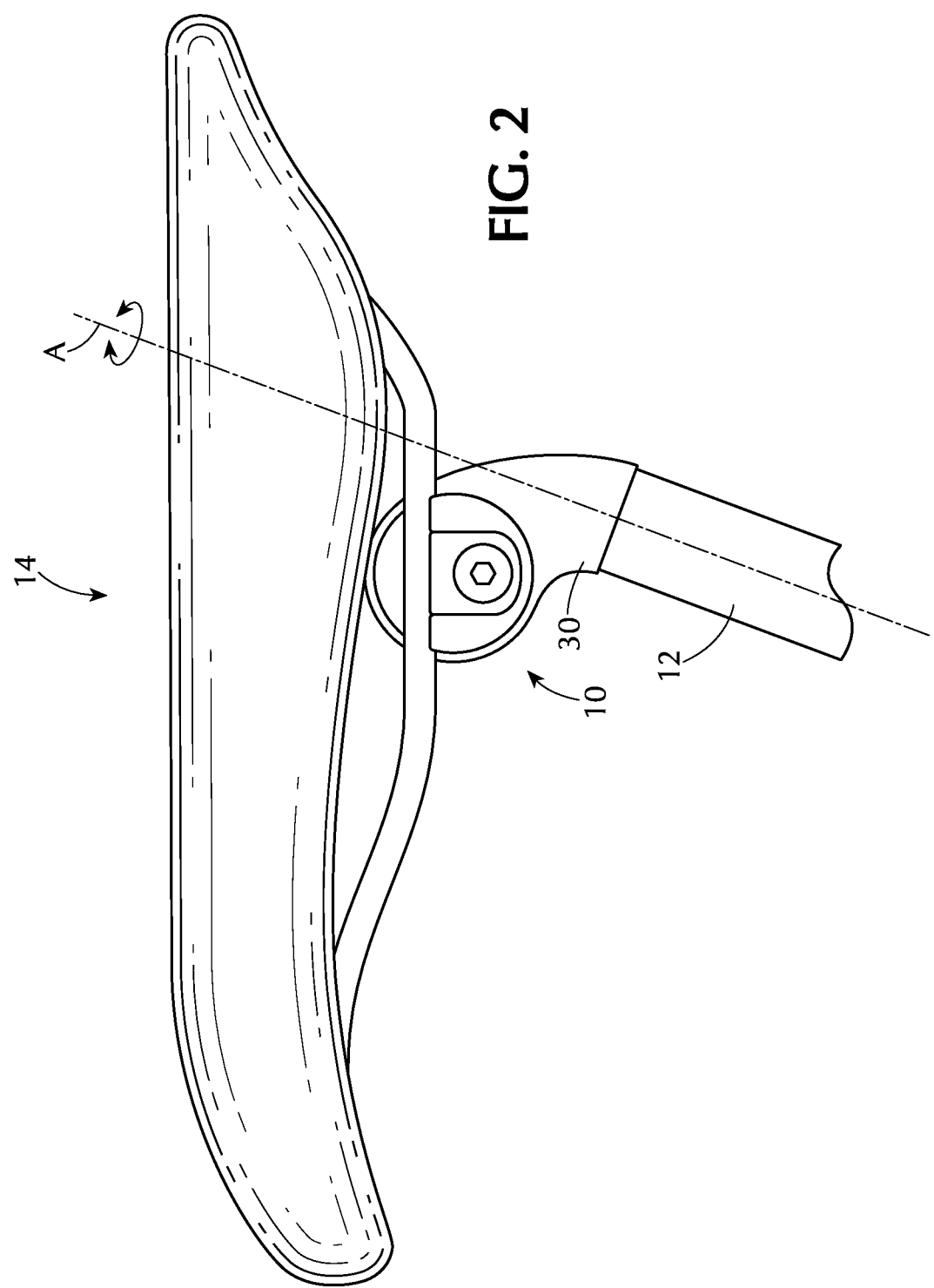
FIG. 2 illustrates a side view of the bicycle seat clamp assembly shown in FIG. 1 with the assembly in a forward position.

Referring now to the figures, a compact seat clamp assembly 10 is shown. The assembly 10 allows the user to rotate the seat post 12 180° (see FIGS. 1 and 2) about rotational axis A so that the seat 14 has a greater front to back range of adjustment and its front to back range of adjustment is not limited to a length 16 of the rails 18 of the seat 14. The seat 14 may also be oriented so as to be level (i.e., 0°) or at any other rider preferred angle (e.g., +/−10° regardless of the orientation of the seat post. Moreover, the seat clamp assembly 10 may accept a wide range of rail sizes since the seat clamp assembly has upper members 20, 22 and lower members 24, 26 (see FIGS. 4 and 5) which provide a vertical clamping motion and force on the rails 18 instead of a horizontal clamping motion and force.

Figure 3:
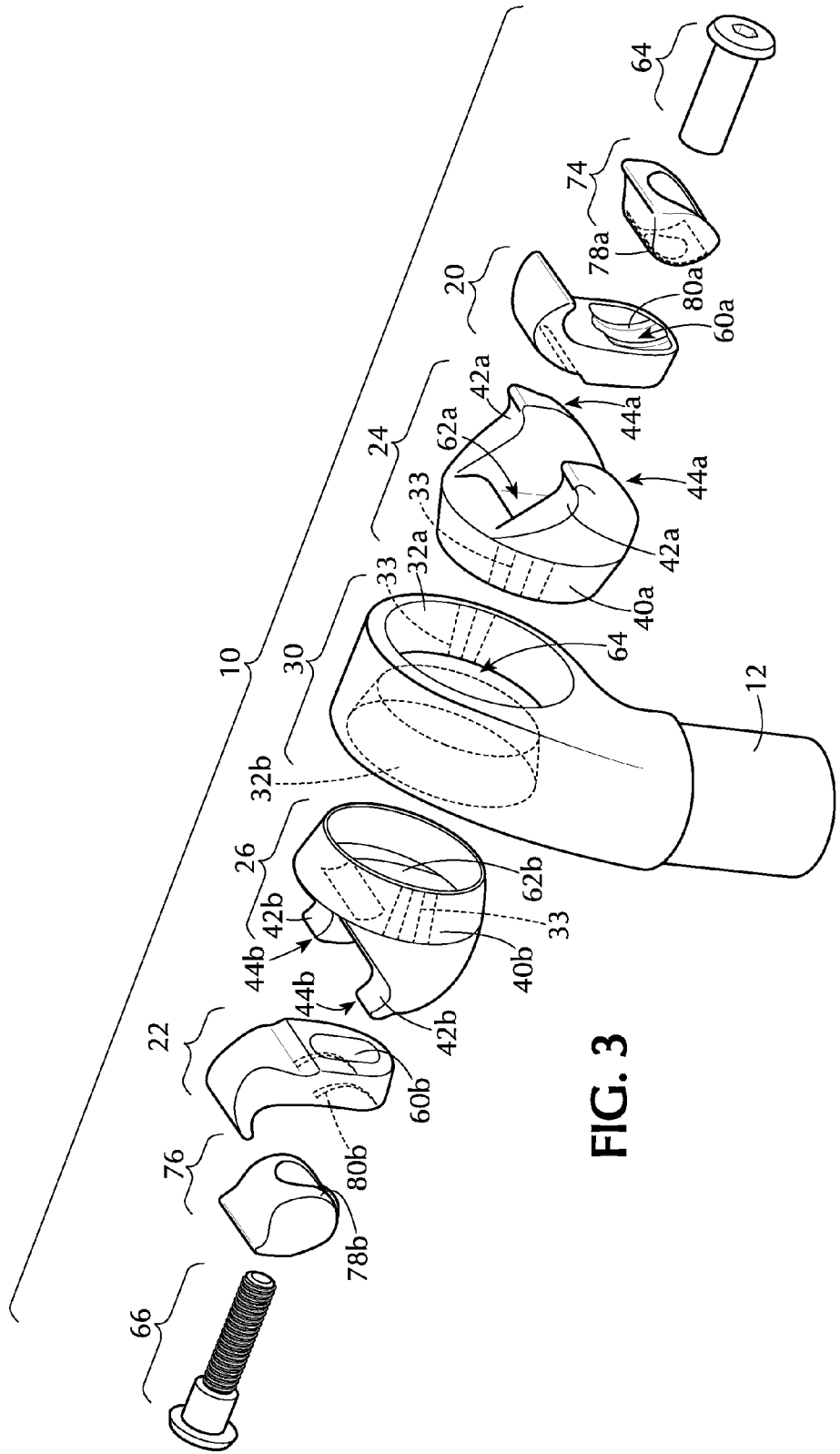
FIG. 3 illustrates an exploded perspective view of the bicycle seat clamp assembly.
Figure 6:
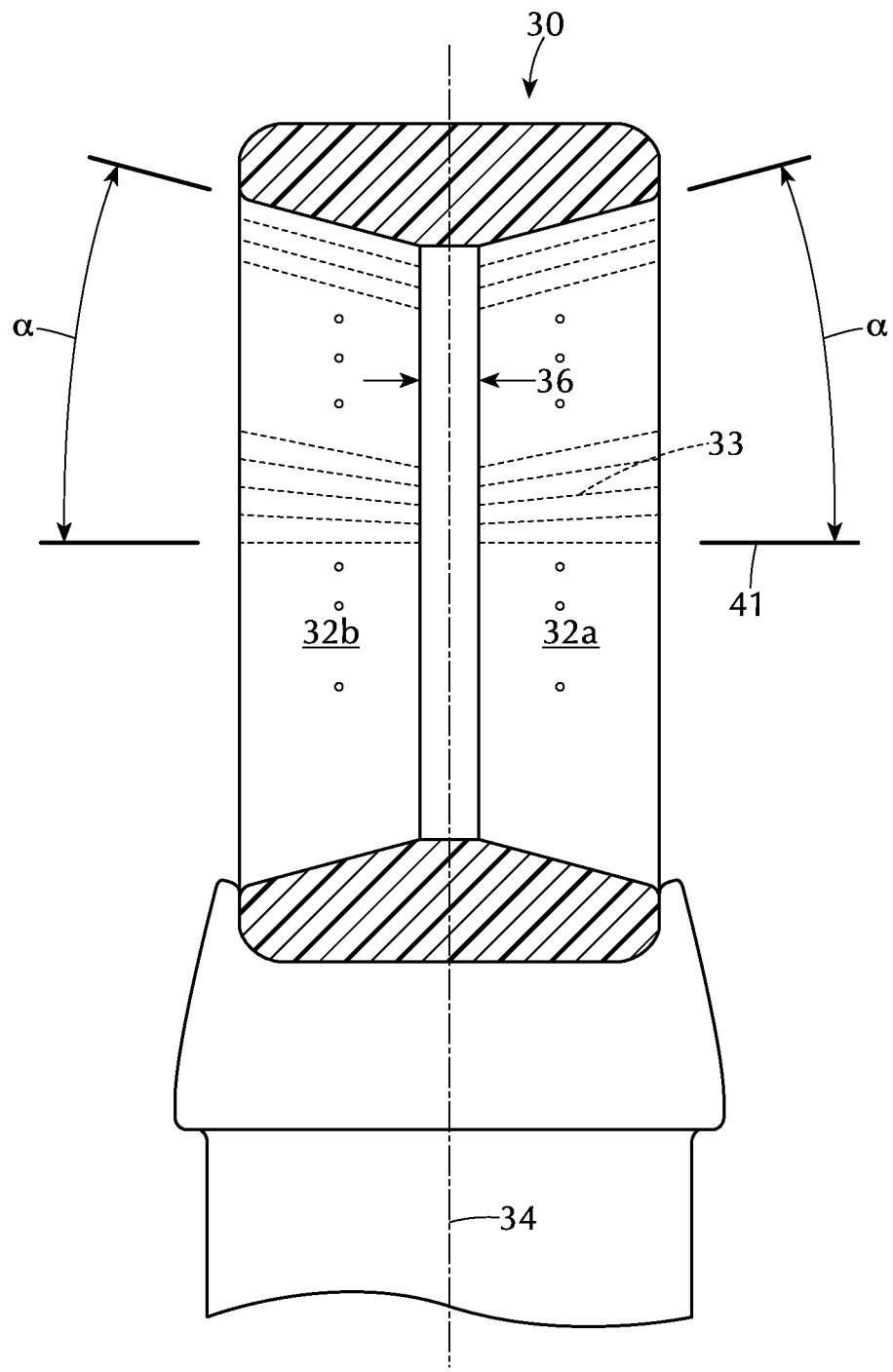
FIG. 6 is a cross sectional view of a body of the bicycle seat clamp assembly shown in FIG. 3.

Referring now to FIG. 3, the seat clamp assembly 10 may have a body 30. The body 30 is shown as being mounted to the seat post 12 in FIGS. 1 and 2. However, it is also contemplated that the body 30 may be integrated into the seat post 12 itself. In other words, the body 30 may be fabricated as a unitary structure with the seat post 12. The body 30 has opposed frusto conical surfaces 32a, b that are symmetrical to each other about a vertical plane 34 (see FIGS. 4 and 6) at a midpoint of the body 30. The frusto conical surfaces 32a, b may have an angle α (see FIG. 6) with respect to a central axis 41 within the range of about 5° to about 25°. Preferably, the angle α is about 15°. The frusto conical surfaces 32a, b may be separated by gap 36. The frusto conical surfaces 32a, b may also be smooth or knurled 33. The knurls index the tilt angle of the seat. If the frusto conical surfaces 32a, b are knurled 33, then knurls 33 may extend parallel to the central axis 41. When the seat clamp assembly 10 is adjusted, the seat 14 is limited to the spacing of the knurls 33. If the frusto conical surfaces 32a, b are smooth, then the seat can be tilted to any desired angle. The tilt angle of the seat 14 is not limited by the knurls 33. The tilt angle of the seat may be fine tuned to any angle.

The body 30 may be fabricated from a rigid component. By way of example and not limitation, the body 30 may be fabricated from a metallic material (e.g., steel, aluminum, titanium or other suitable material). The body 30 may be integrated into the seat post 12 as a separate component. For example, the seat post 12 may be fabricated from carbon fiber material. The body 30 may be molded into the carbon fiber seat post 12. After the carbon fiber is cured, then the body 30 is permanently attached to the seat post 12. It is also contemplated that the features of the body 30 may be formed in the seat post 12 itself.

Figure 4:
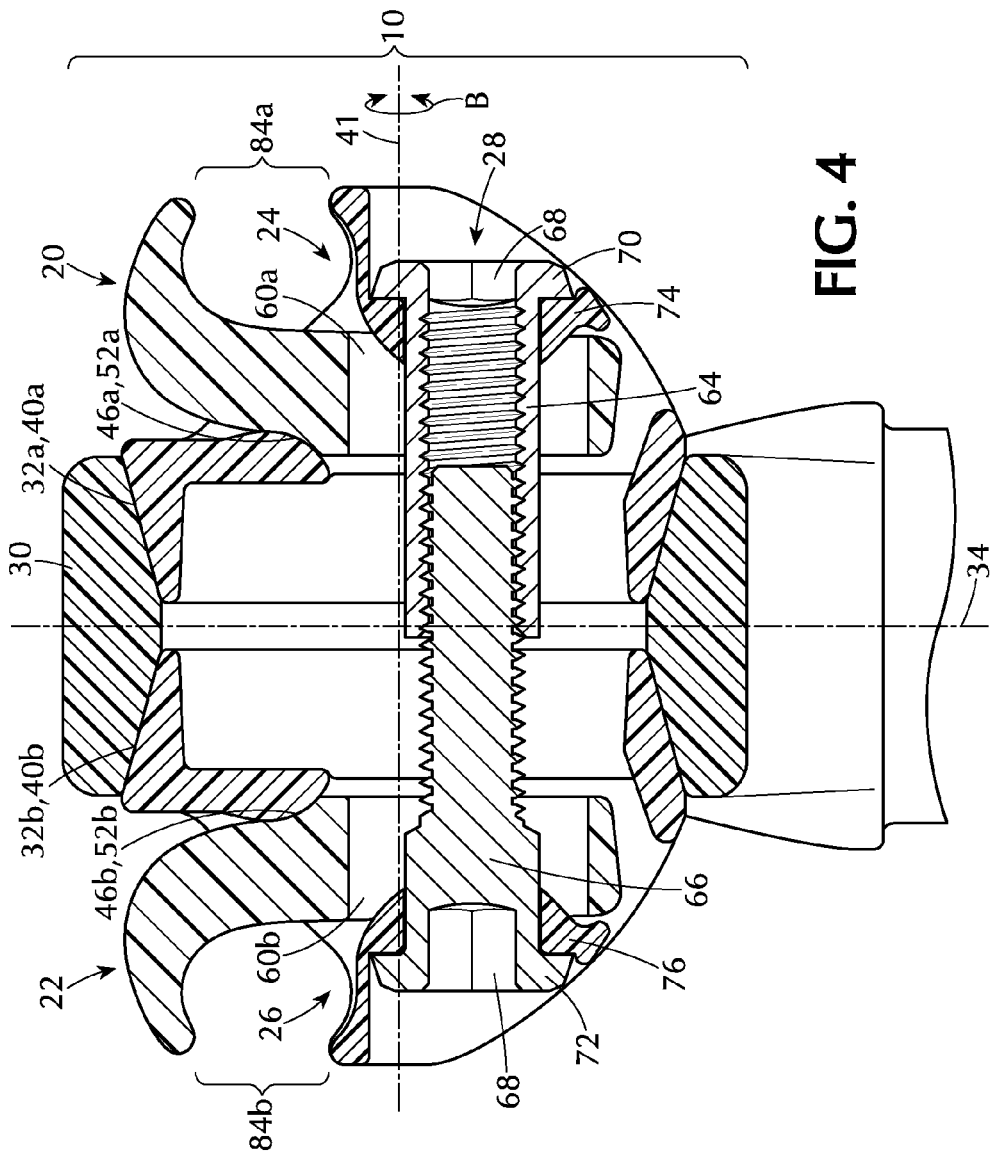
FIG. 4 is a cross sectional view of the bicycle seat clamp assembly prior to the installation of the seat to a seat post.
Figure 7:
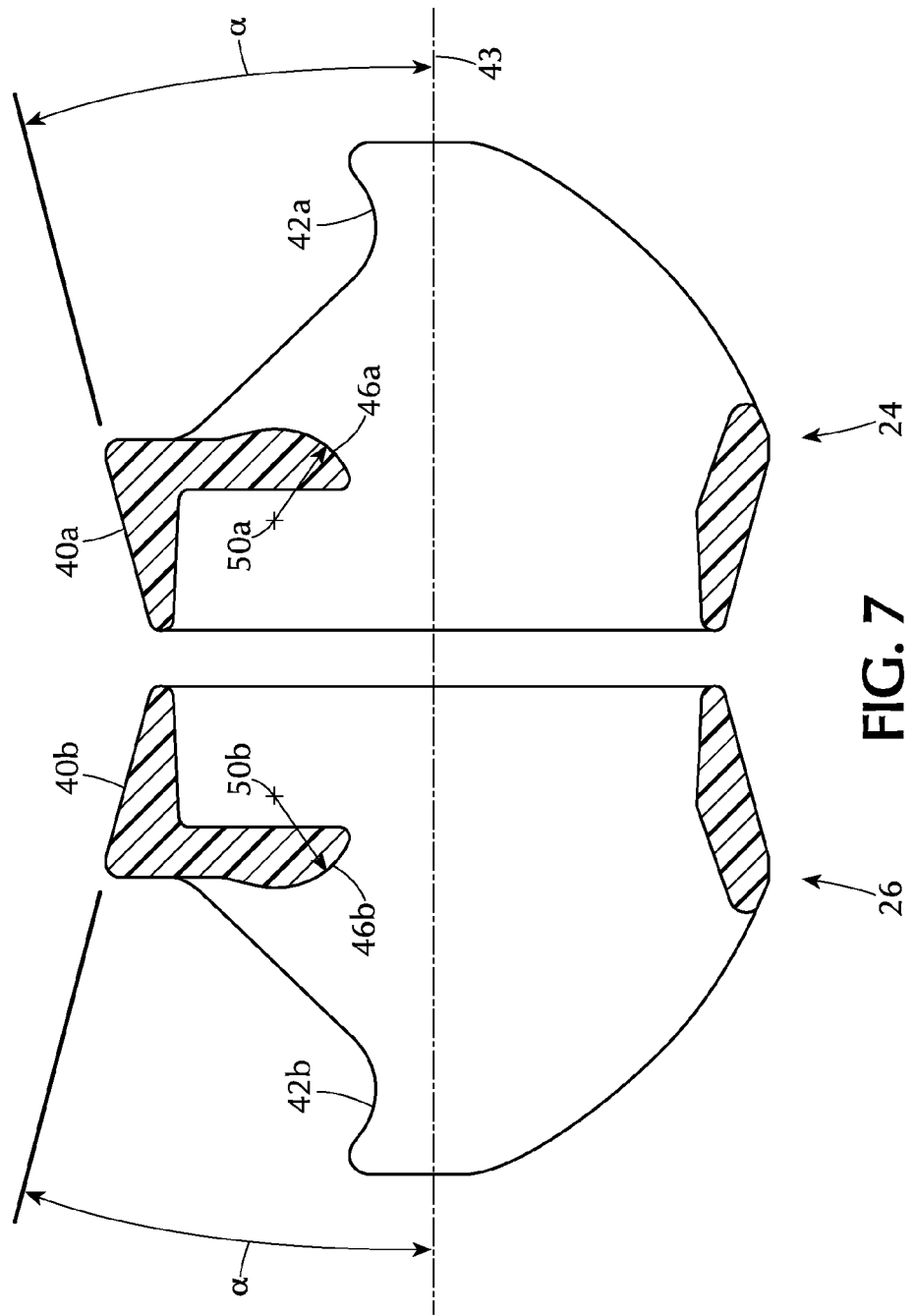
FIG. 7 is a cross sectional view of lower members of the bicycle seat clamp assembly shown in FIG. 3.

Referring now to FIGS. 3, 4 and 7, the seat clamp assembly 10 may additionally have opposed lower members 24, 26. These lower members 24, 26 may be identical to each other and oriented symmetrically about the vertical plane 34 of the body 30 as shown in FIG. 4. The lower members 24, 26 may have respective frusto conical contact surfaces 40a, b (see FIG. 7). The contact surfaces 40a, b of the lower members 24, 26 are seated onto the opposed frusto conical surfaces 32a, b of the body 30 shown in FIG. 4. The frusto conical surfaces 40a, b of the lower number 24, 26 may be smooth or knurled. If knurled, the knurls 33 may be parallel to the central axis 43 of the lower members 24, 26. If the frusto conical surfaces 40a, b and 32a, b are smooth, then the seat 12 may be tilted and fine tuned to any angle. The smooth surfaces do not limit the tilt angle of the seat. It provides an infinite angle adjustment. If the frusto conical surfaces 32a, b, 40a, b of the upper and lower members 20, 22, 24, 26 are knurled, then the knurls of the frusto conical surfaces 40a, b will engage the knurls of the frusto conical surfaces 32a, b of the body 30. The knurls 33 formed on the respective surfaces 32a, b and 40a, b limit the angular tilt of the seat since the knurls 33 interlock with each other. The tilt angle of the seat is indexed to the knurls. The knurls 33 may be ridges and grooves formed on the surfaces 32a, b and 40a, b. The length of the ridges and grooves may be parallel with the central axes 41 or 43.

When the horizontally oriented fastening device 28 (see FIG. 4) is loosened, the lower members 24, 26 are loosened off of the body 30. The lower members 24, 26 may rotate 360 degrees about the central axis 41 of the frusto conical surfaces 32a, b of the body 30 as shown by arrow B (see FIG. 4). In this manner, whether the seat post 10 is oriented backwards (see FIG. 1) or forwards (see FIG. 2), the seat clamp assembly 10 can be angularly adjusted so that the seat 14 is level or set to a front to back tilt angle as desired by the user. When the fastening device 28 is tightened, the frusto conical surfaces 40a, b of the lower members 40a, b are wedged into the frusto conical surfaces 32a, b of the body 30.

The frusto conical surfaces 40a, b of the lower members 24, 26 may also define an angle equal to α (see FIG. 7). The angle α of the frusto conical surfaces 40a, b may match the angle α of the frusto conical surfaces 40a, b of the lower members 24, 26 to facilitate wedging of the lower members 24, 26 into the body 30. The lower members 24, 26 additionally have lower contact surfaces 42a, b which receive rails 18 of the seat 14. The rails 18 rest on the lower contact surfaces 42a, b (see FIG. 3) and determine the front to back angular orientation of the rails 18 as well as the seat 14. Each of the lower members 24, 26 may have structural sidewalls 44a, b which define the lower contact surfaces 42a, b. The structural sidewalls 44a, b may be sufficiently rigid and stiff to hold up the weight of the rider when the rider is seated in the seat. The lower members 24, 26 may be fabricated from a rigid metallic material such as steel, aluminum, titanium. It is also contemplated that the lower members 24, 26 may be fabricated from a carbon fiber material or composite material. The lower members 24, 26 additionally have pivot contact surfaces 46a, b (see FIG. 7). As discussed below, the upper members 20, 22 engage and rotate about a center of the pivot contact surfaces 46a, b upon tightening of the fastening device 28. The pivot contact surfaces 46a, b may be semi circular. The center of the semi circular surfaces 46a, b define pivot axes 50a, b about which the upper members 48a,b rotate as the fastening device 28 is being tightened.

Referring now to FIG. 8, the upper members 20, 22 may have elongate slots 60a, b (see FIGS. 3 and 8). The elongate slots 60a, b may be in a generally vertical orientation as shown in FIG. 3. The elongate slots 60a, b allow the fastening device 28 to traverse up and down during pivoting of the upper members 20, 22.

The upper members 20, 22 may have mating contact surfaces 52a, b to contact surfaces 46a, b of the lower members 24, 26. The mating contact surfaces 52a, b contact and slide against the contact pivot surfaces 46a, b of the lower members 24, 26. The mating contacting surfaces 52a, b may also have a semi circular cross section. The radius of the mating contact surfaces 52a, b may be equal to the radius of the pivot contact surfaces 46a, b so that the upper members 20, 22 may rotate about the pivot axes 50a, b. When the horizontal fastener 28 is tightened, the upper members 20, 22 may pivot about the pivot axes 50a, b and slide on the respective contact surfaces 46a, b and 52a, b, as shown by a comparison of FIGS. 4 and 5. As the upper members 20, 22 pivot from the position shown in FIG. 4 to the position shown in FIG. 5, the upper members 20, 22 pivot downward. The upper and lower members 20, 22, 24, 26 apply vertical clamping forces 54 (see FIG. 5) to the rails 18 of the seat 14 as the horizontal fastening device 28 is tightened.

The rails 18 of the standard conventional seats 14 come in numerous sizes (e.g., 7×9, 7×8, 7×9.5, etc.). However, the upper and lower surfaces 56a, b and 58a, b (see FIG. 5) of the rails 18 of standard conventional seats 14 maintain the same curved shape even though the heights of the rails 18 may vary. By way of example and not limitation, the upper and lower surfaces 56a, b and 58a, b of the various rails typically have a semi circular cross section. The lower contact surfaces 42a, b of the lower members 24, 26 may match the contour and shape of the lower surfaces 58a, b of the rails 18. Upper contact surfaces 60a, b of the upper members 20, 22 may be sized and configured to match the upper surfaces 56a, b of the rails 18. Preferably, the surfaces 60a, b, 58a, b, 56a, b and 42a, b have a semi circular cross section even if the distances between the upper and lower surfaces 56a, b, 58a,b may vary among different rails 18. As such, the seat clamp assembly 10 may provide a universal fit for standard conventional seats. Although the seat clamp assembly 10 discussed herein is described as being used in conjunction with seat rails 18 having semi circular upper and lower surfaces 56a, b, 58a, b, it is contemplated that the seat clamp assembly 10 may be used in conjunction with seat rails 18 having upper and lower surfaces 56a, b, 58a, b having configurations other than semi circular. The contact surfaces 42a, b of the lower members 24, 26 and the contact surfaces 60a, b upper members 20, 22 are configured to match the configurations of the upper and lower surfaces 56a, b, 58a, b of the rails 18 of the seat.

Figure 5:
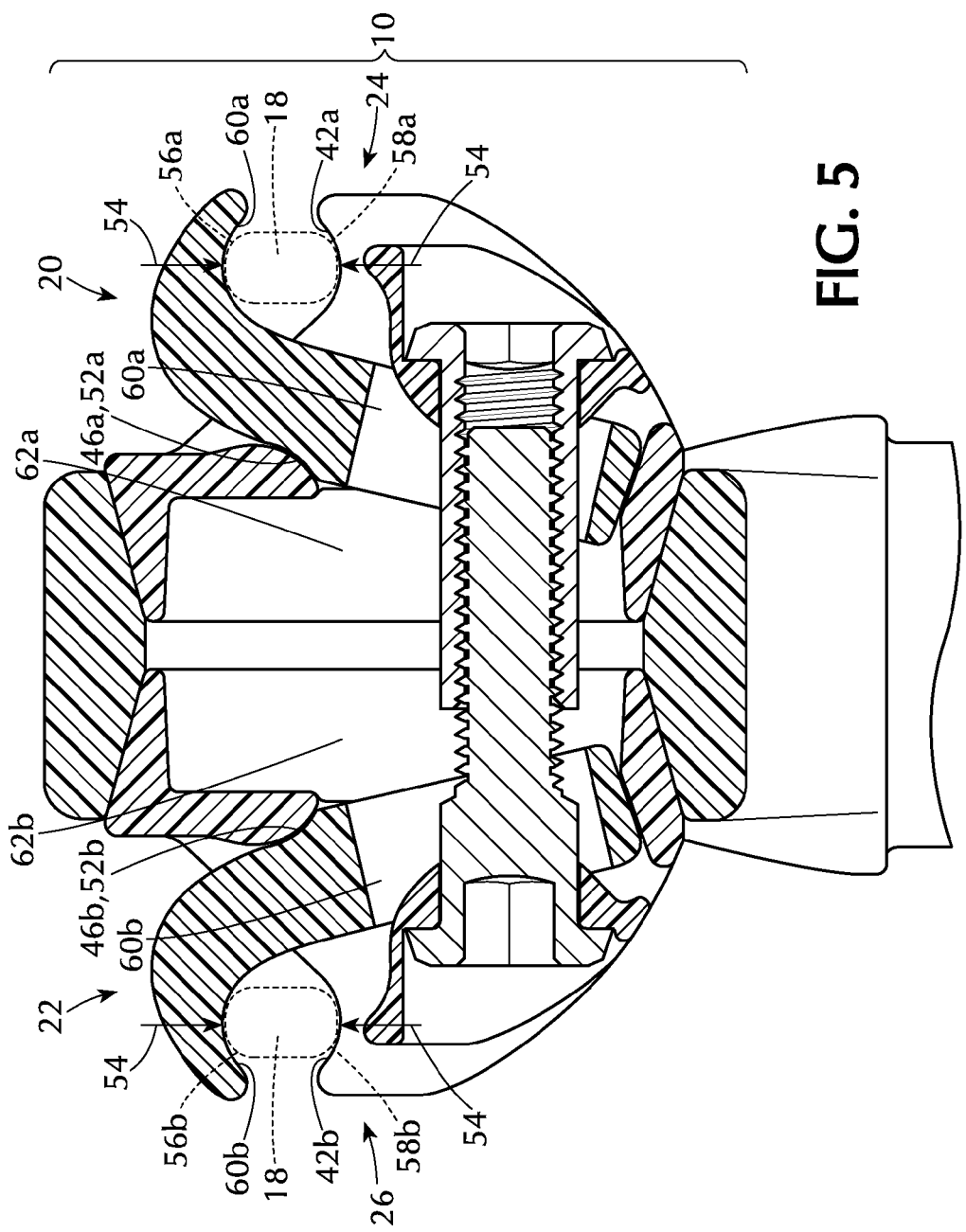
FIG. 5 is a cross sectional view of the bicycle seat clamp assembly shown in FIG. 1 with the seat attached to the seat post.

The fastening member 28 may be inserted through slots 60a, b (see FIG. 3) of the upper members 20, 22, apertures 62a, b formed in the lower members 24, 26 and the central aperture 64 of the body 30. The fastening device 28 may comprise first and second threaded components 64, 66. The first component 64 may have internal threads, whereas, the second component 66 may have external threads. As shown in FIGS. 4 and 5, the first and second components 64, 66 may be threadably engageable to each other. To tighten the seat clamp assembly 10, the first component 64 may be held in a stationary manner by friction, inter locking engagement with the washer 74 or with an allen wrench. The user inserts an allen wrench into a receiver 68 in a head of the second component 66. The allen wrench is rotated so that the second component 66 is further engaged into the first component 64. The heads 70, 72 of the first and second component, 64, 66 are seated into washers 74, 76 and rotated within the washers 74, 76. The curved surfaces 78a, b (see FIG. 9) of the washers 74, 76 rotate and slide against curved surfaces 80a, b (see FIG. 8). This sliding action allows the upper members 20, 22 to pivot about the contact surfaces 46a, b and 52a, b while maintaining the fastening device 28 in the horizontal orientation. The washers 74, 76 prevent stress concentrations on the heads 70, 72 of the first and second components 64, 66.

The washers 74, 76 have mating semi-circular surfaces 78a, b that are seated onto surfaces 80a, b (see FIG. 8) of the upper members 20, 22. The washers 74, 76 maintain the horizontal position of the fastening device 28 as the fastening device 28 is tightened and the upper members 20, 22 are pivoted. This is shown by comparison of FIGS. 4 and 5.

In use, the seat 12 is mounted to the seat clamp assembly 10 by first loosening the fastening device 28. When the fastening device 28 is loosened, the upper members 20, 22 may pivot upward so that a mouth 84a, b (see FIG. 4) defined by the upper and lower members 20, 22, 24, 26 can receive rails 18 of the seat 12. The lower members 24, 26 are also not wedged into the body 30. The upper and lower members 20, 22, 24, 26 can rotate about the central axis 41 of the aperture in the body 30. This allows the user to adjust a forward to rearward tilt angle of the seat as desired by the rider. Moreover, if the seat 12 must be adjusted closer to the handlebars of the bicycle, the seat post 12 may be rotated about pivot axis A to the position shown in FIG. 2. If the seat 12 must be adjusted closer to the rear of the bicycle, then the seat post 12 may be rotated about pivot axis A to the position shown in FIG. 1. After adjusting the front to back position of the seat 12 and the forward/rearward angular tilt of the seat 12, the fastening device 28 is tightened. To this end, either one of the first and second components 64, 66 of the fastening device 28 may be held in a stationary position. In the drawings, the first component 64 is held in the stationary position by friction with the washer or other means known in the art or developed in the future. The user rotates the second component 66 to engage and tighten the first and second components 64, 66. As shown in the drawings, the head of the second component 66 has an Allen wrench receiver 68. The user inserts an Allen wrench into the receiver 68 and turns the second component 66 to further engage the second component 66 into the first component 64.

As the fastening device 28 is tightened, the upper members 20, 22 begin to rotate and the contact surfaces 60a, b of the upper members 20, 22 move downward and apply a vertical clamping force 54 (see FIG. 4) to the rails 18 of the seat 12. The mating contact surfaces 52a, b of the upper members 20, 22 which have the same configuration as the contact surfaces 46a, b of the lower members 24, 26 begin to slide downward about the pivot axes 50a, b (see FIG. 7). The rotation of the upper members 20, 22 also causes the fastening device 28 to move lower. The vertical elongate slot 60a, b in the upper members 20, 22 allows for such lowering movement of the fastening device 28. Moreover, the washers 74, 76 rotate on the upper members 20, 22 to keep the fastening device 28 horizontal. The mating surfaces 78a, b of the washers 74, 76 mate with and have the same configuration as the surfaces 80a, b of the upper members 20, 22. Preferably, these surfaces are semi circular to allow for rotation. Despite rotation of the upper members 20, 22, the washers 74, 76 maintain the horizontal positioning of the horizontal fastening device 28.

As the fastening device 28 is tightened, the lower members 24, 26 are wedged into the body 30. More particularly, the frusto conical surfaces 32a, b and 40a, b are engaged to each other. The rear location of the seat and the front to back angular tilt are set through one fastening device. To readjust the seat, the fastening device 28 is loosened and the above process repeated.

The various components of the bicycle seat clamp assembly 10 such as the body 30, lower members 24, 26, upper members 20, 22, washers 74, 76 and the first and second components 64, 66 may be fabricated from a rigid and stiff material. By way of example and not limitation, the materials contemplated are steel, aluminum, titanium, aluminum alloys, titanium alloys, and/or composites. The components 30, 24, 26, 20, 22, 74, 76, 64, 66 may be fabricated from the same material or selected from any combination of materials.

The above description is given by way of example, and not limitation. Given the above disclosure, one skilled in the art could devise variations that are within the scope and spirit of the invention disclosed herein, including various ways of holding the first component 64 in the stationary position Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A seat clamp assembly for securing a bicycle seat to a bicycle frame, the assembly comprising:
   a body defining a vertical plane;
   a first member disposed on a first side of the body, the first member having a curved surface defining a first pivot axis which is oriented parallel to the vertical plane;
   a second member disposed on an opposed second side of the body, the second member having a curved surface defining a second pivot axis which is oriented parallel to the vertical plane;
   a third member having a curved surface mating against the curved surface of the first member so that the third member is pivotable about the first pivot axis to provide for vertical displacement of a clamping portion of the third member;
   a fourth member having a curved surface mating against the curved surface of the second member so that the fourth member is pivotable about the second pivot axis to provide for vertical displacement of a clamping portion of the fourth member;
   a fastening system extending through the aperture of the body for fixing relative positions of the first, second, third and fourth members together upon tightening of the fastening system;
   wherein the third and fourth members are pivotally displaced upon tightening of the fastening system, and the first and second members along with the clamping portions of the third and fourth members produce a vertical clamping force applied to rails of the bicycle seat between the first and second members and the claming portions of the third and fourth members.

2. The assembly of claim 1 wherein the first and second members are disposed inward with respect to the third and fourth member from the vertical plane.

3. The assembly of claim 1 wherein the first and second members are disposed on one side of the rails and the third and fourth members are disposed on the other side of the rails.

4. The assembly of claim 3 wherein the first and second members are disposed under the rails and the third and fourth members are disposed above the rails.

5. The assembly of claim 1 wherein the body has an aperture defined by frusto conical surfaces which extend 360 degrees about a central axis of the aperture to allow for a wide range of front to back angular tilting of the seat so that a seat post can be rotated in a forward direction or a rearward direction.

6. The assembly of claim 1 wherein the body forms a housing having an aperture formed therethrough, the aperture defining a central axis which is horizontal to a ground and perpendicular to the vertical plane, the aperture defining first and second opposed frusto conical surfaces, and wherein the first member has a first frusto conical surface which mates with the first frusto conical surface of the aperture of the housing, and the second member has a second frusto conical surface which mates with the second frusto conical surface of the aperture of the housing.

7. The seat clamp assembly of claim 6 wherein at least one of the first frusto conical surface of the aperture and the first frusto conical surface of the first member has knurls, and at least one of the second frusto conical surface of the aperture and the second frusto conical surface of the second member has knurls to mitigate inadvertent front to back angular tilting of the seat during use after tightening the fastening device.

8. The seat clamp assembly of claim 6 wherein the first and second frusto conical surfaces of the aperture and the first and second frusto conical surfaces of the first and second members are smooth to allow for fine tuning of front to back angular tilting of the seat.

9. The seat clamp assembly of claim 1 wherein the curved surfaces of the first and second members have a semi circular cross section and mate with corresponding curved surfaces of the third and fourth members.

10. A method for attaching a seat to a seat post of a bicycle, the method comprising the steps of:
   opening first upper and lower members and second upper and lower members of a seat clamp assembly so that a first entrance defined by the first upper and lower members and a second entrance defined by the second upper and lower members are sufficient to receive first and second rails of the seat;
   fitting a first rail of the seat between the first upper and lower members and the second rail of the seat between the second upper and lower members;
   tightening a horizontal fastening device;
   pivoting the first and second upper members about pivot axes defined by curved surfaces of the first and second lower members that mate respectively to curved surfaces of the first and second lower members to vertically displace clamping portions of the first and second upper members so that the clamping portions of the first and second upper members and the first and second lower members apply vertical clamping forces on the first and second rails of the seat.

11. The method of claim 10 wherein the pivoting step includes sliding a curved contact surface of the first upper member against a mating curved contact surface of the first lower member and sliding a curved contact surface of the second upper member against a mating curved contact surface of the second lower member.

12. The method of claim 11 wherein the curved contact surfaces of the first and second upper and lower members have a semi-circular cross section and have a common radius.

13. The method of claim 11 wherein the horizontal fastening device comprises first and second fastening components, the first component having internal threads and the second component having external threads aligned perpendicularly to a vertical plane defined by a body of the seat clamp assembly, the internal threads of the first component engaging deeper on the external threads of the second component as the fastening device is tightened.

14. A seat clamp assembly for securing a bicycle seat to a bicycle frame, the assembly comprising:
   a body defining a vertical plane;
   a first member disposed on a first side of the body, the first member having a curved surface defining a first pivot axis which is oriented parallel to the vertical plane;
   a second member disposed on an opposed second side of the body, the second member having a curved surface defining a second pivot axis which is oriented parallel to the vertical plane;
   a third member disposed against the first member pivotable about the first pivot axis to provide for vertical displacement of the third member;
   a fourth member disposed against the second member and pivotable about the second pivot axis to provide for vertical displacement of the fourth member;
   a fastening system extending through the aperture of the housing for fixing relative positions of the first, second, third and fourth members together upon tightening of the fastening system;
   first and second washers, the third and fourth members having additional curved surfaces that mate with curved surfaces of the first and second washers to maintain a horizontal position of the fastening system as the third and fourth members pivot;
   wherein the third and fourth members are vertically displaced upon tightening of the fastening system, and the first and second members along with the third and fourth members produce a vertical clamping force applied to rails of the bicycle seat between first, second, third and fourth members.

\* \* \* \* \*